United States Patent
Hannington

(10) Patent No.: US 7,504,147 B2
(45) Date of Patent: Mar. 17, 2009

(54) RETROREFLECTIVE SHEETING WITH SECURITY AND/OR DECORATIVE IMAGE

(75) Inventor: Michael Hannington, Madison, OH (US)

(73) Assignee: Avery Dennison Corporation, Pasadena, CA (US)

( * ) Notice: Subject to any disclaimer, the term of this patent is extended or adjusted under 35 U.S.C. 154(b) by 389 days.

(21) Appl. No.: 10/896,782

(22) Filed: Jul. 22, 2004

(65) Prior Publication Data

US 2006/0019068 A1 Jan. 26, 2006

(51) Int. Cl.
*D06N 7/04* (2006.01)

(52) U.S. Cl. .................. 428/143; 428/141; 428/144; 428/147; 428/148

(58) Field of Classification Search .................. 428/141, 428/143, 144, 147, 148
See application file for complete search history.

(56) References Cited

U.S. PATENT DOCUMENTS

| | | | |
|---|---|---|---|
| 2,354,018 A | 7/1944 | Heltzer et al. | 88/82 |
| 2,354,049 A | 7/1944 | Palmquist | 40/135 |
| 2,407,680 A | 9/1946 | Palmquist et al. | 88/82 |
| 3,552,822 A | 1/1971 | Altman | 350/126 |
| 3,795,435 A | 3/1974 | Schwab | 350/105 |
| 3,801,183 A * | 4/1974 | Sevelin et al. | 359/537 |
| 4,605,461 A | 8/1986 | Ogi | 156/233 |
| 5,563,738 A | 10/1996 | Vance | 359/614 |
| 5,882,771 A | 3/1999 | Klein et al. | 428/161 |
| 6,054,208 A | 4/2000 | Rega et al. | 428/323 |
| 6,172,814 B1 | 1/2001 | Watanabe et al. | 359/619 |
| 6,350,036 B1 * | 2/2002 | Hannington et al. | 359/541 |
| 6,558,009 B2 | 5/2003 | Hannington et al. | 359/534 |
| 2003/0151815 A1 | 8/2003 | Hannington et al. | 359/536 |
| 2004/0096627 A1 | 5/2004 | Hannington | 428/143 |

OTHER PUBLICATIONS

PCT/US05/22347; International Search Report mailed Sep. 27, 2005.

* cited by examiner

*Primary Examiner*—Alicia Chevalier

(57) ABSTRACT

The present invention provides a retroreflective sheet with a discernable image. The retroreflective sheet comprises a transparent polymeric spacing layer having a first surface and a second surface; a layer of transparent microsphere lenses embedded into the first surface of the spacing layer at varying depths forming an image, wherein the spacing layer adheres to and conforms to the microspheres; and a reflective layer adhered to the second surface of the spacing layer. The present invention also provides methods for preparing such retroreflective sheet.

17 Claims, 3 Drawing Sheets

RETROREFLECTIVE SHEETING WITH SECURITY AND/OR DECORATIVE IMAGE

TECHNICAL FIELD

The present invention relates generally to retroreflective sheets containing an image. In particular, the invention relates to retroreflective sheeting with an embedded image having a varying appearance at different angles of viewing.

BACKGROUND

Retroreflective materials are employed for various safety and decorative purposes. A demand exists for retroreflective materials having discernible patterns, graphics or validation images formed thereon. The discernible patterns or graphics may be directional or non-directional. A directional image produces a varying appearance at different angles of view.

A validation image, such as a watermark, is an identifying pattern or legend either on or in a material to provide validation of the material. Retroreflective sheeting with directional and non-directional watermarks have been used as a validation means for documents, cassette tapes, compact disk containers, digital versatile disk (DVD) containers, electronic devices, traffic signage and license plates.

One problem with watermarks on retroreflective material is providing the watermark in a manner that provides the needed authentication but that provides some subtlety or inconspicuousness, such as being discernible in relatively few angles of viewing. Often expensive processing steps and equipment are required to provide such a watermark. Additionally, there is generally little processing control over the conspicuousness or intensity of the watermark.

It is desirable to have an image that is distinct and viewable for authenticating purposes. Further, it is desirable to have a high speed, high quality, low cost process of producing discernible patterns for graphic, decorative and other utilitarian purposes on retroreflective sheeting.

SUMMARY

The present invention provides a retroreflective sheet with an image. In a first aspect of the invention, the retroreflective sheet comprises a transparent polymeric spacing layer having a first surface and a second surface; a layer of transparent microsphere lenses embedded into the first surface of the spacing layer at varying depths forming an image, wherein the spacing layer adheres to and conforms to the microspheres; and a reflective layer adhered to the second surface of the spacing layer.

In one embodiment, one or more protective layers may be applied to the top surface of the microsphere lenses. The protective layer may be a topcoat and/or a cover sheet. The topcoat and/or cover sheet of the retroreflective sheet overlies and conforms to the top surface of the microsphere lenses.

The present invention also provides a process of preparing a retroreflective sheet with an image. The process comprises providing a transparent polymeric spacing layer having a first surface and a second surface wherein the first surface has a layer of transparent microsphere lenses adhered thereto. The spacing layer is heated and the microspheres are pressed into the spacing layer at varying depths to form an image, and the spacing layer conforms to the microspheres. After the layer of microspheres is pressed into the spacing layer, a protective layer may be applied to the top surface of the embedded microspheres. A reflective layer is applied to the second surface of the spacing layer to form a retroreflective sheet.

In one embodiment, the microsphere lenses are embedded into the spacing layer by an embedding roll. The embedding roll includes one or more elevated regions or one or more depressed regions or an array of elevated and depressed regions on its surface. The microspheres are embedded into the spacing layer at varying depths corresponding to the elevated and/or depressed regions of the embedding roll. Once embedded, the upper surfaces of the microspheres are aligned at various depths corresponding to the elevated and depressed regions of the embedding roll surface.

In another embodiment, the microsphere lenses are embedded into the spacing layer by an embedding roll and a backing roll. The embedding roll has a flat surface and the backing roll includes one or more elevated regions or one or more depressed regions or an array of elevated and depressed regions on its surface. The microspheres are embedded into the spacing layer at varying depths corresponding to the elevated and/or depressed regions of the backing roll. Once embedded, the upper surfaces of the microspheres are substantially aligned corresponding to the flat surface of the embedding roll.

In one embodiment, the spacing layer is coated onto a casting construction comprising a molding layer having a first and second surface, and a support layer in contact with the second surface of the molding layer prior to the embedding step. The spacing layer is coated onto the first surface of the molding layer, and then the layer of microspheres is pressed into the spacing layer. The casting construction is then removed from the spacing layer and the reflective layer is deposited on the second surface of the spacing layer to form a retroreflective sheet.

DETAILED DESCRIPTION

Figure 1:
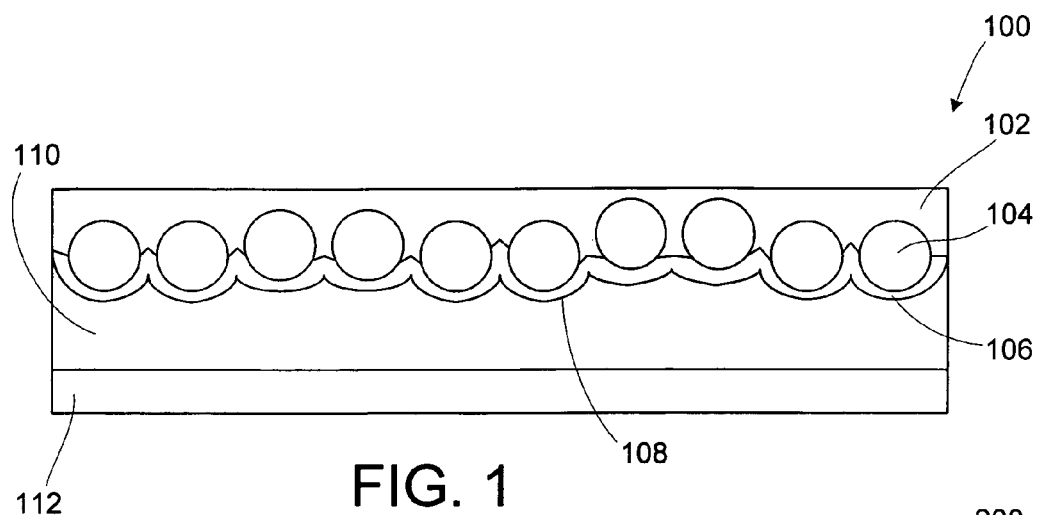
FIG. 1 is a cross-sectional view of an embodiment of a retroreflective sheeting according to the present invention.

A retroreflective sheet of a first embodiment comprises a transparent polymeric spacing layer having a first surface and a second surface; a layer of transparent microsphere lenses embedded into the first surface of the spacing layer at varying depths forming an image, wherein the spacing layer adheres to and conforms to the microspheres; and a reflective layer adhered to the second surface of the spacing layer.

As described above, the retroreflective sheet of the present invention has a spacing layer having a first and second surface. The spacing layer of the present invention adheres to and conforms to the bottom surfaces of the layer of microsphere lenses. The resins that may be used for the spacing layer include a variety of partially amorphous or semi-crystalline thermoplastic polymers which generally have a soft stage during which the microspheres can be embedded in the films. The material used to form the spacing layer should be compatible with the optional protective layer material and adapted to form a good bond with the protective layer and the microspheres. Preferably, the adhesion between the materials is greater than the tensile strength of the materials. Acrylics, polyvinyl butyrals, aliphatic urethanes and polyesters are particularly useful polymer materials because of their outdoor stability. Copolymers of ethylene and an acrylic acid or methacrylic acid; vinyls, fluoropolymers, polyethylenes, cellulose acetate butyrate, polycarbonates and polyacrylates are other examples of polymers that can be used for the spacing layers and optional protective layers in the retroreflective sheet of the present invention.

The thickness of the spacing layer is dependent upon the index of refraction and the average diameter of the microspheres, and the index of refraction of the topcoat and/or cover sheet and spacing layer. Considered from an optical point of view, the following relation is derived for light rays approximating the axis, if the microsphere diameter is "d" and the thickness of the spacing layer is "h".

$$h = d \times f, \text{ wherein "f" is the proportionality factor.} \quad (1.)$$

In respect to the proportionality factor "f" the following equation in turn applies:

$$f = n_3(n_2 - 2n_1)/2n_1(n_3 - n_2) + n_3(n_1 - n_2) \quad (2)$$

Wherein: $n_1$ is the index of refraction of the topcoat and/or cover sheet; $n_2$ is the index of refraction of the microsphere; and $n_3$ is the index of refraction of the spacing layer.

In one embodiment it is desirable to use materials having elastomeric properties to provide retroreflective sheeting which may be repeatedly stretched or flexed, and upon release of the stretching or flexing tension, rapidly return to substantially their original dimensions without significant loss of retroreflectivity. Polyurethanes are available which possess such elastomeric properties and these materials can be used as spacing layer materials.

The retroreflective sheeting also has a layer of microsphere lenses embedded into the spacing layer. In one embodiment, a monolayer of microspheres is embedded into the spacing layer. The microsphere lenses of the present invention may have any refractive index or average diameter provided that the beads provide the necessary refraction for the retroreflection application. The transparent microsphere lenses utilized in the retroreflective sheeting of the present invention may be characterized as having average diameters in a range of from about 25 to about 300, 30 to about 120 microns, and more often in a range from about 40 to about 80 microns. The index of refraction of the microsphere lenses is generally in the range from about 1.9 to about 2.5, more typically is in the range from about 2.0 to about 2.3, and most often between about 2.10 to about 2.25.

Glass microspheres are typically used although ceramic microspheres such as those made by sol/gel techniques can also be used. The index of refraction and the average diameter of the microspheres, and the index of refraction of the topcoat and/or cover sheet and spacing layer dictate the thickness of the spacing layer. The microspheres can be subjected to chemical or physical treatments to improve the bond of the microspheres to the polymeric films. For example, the microspheres can be treated with a fluorocarbon or an adhesion promoting agent such as an aminosilane to improve the bond, or the spacing layer in which the microspheres have been embedded can be subjected to a flame treatment or corona discharge to improve the bond between the spacing layer and microspheres to the subsequently applied protective layer.

The retroreflective sheeting of the present invention also includes a reflective layer deposited over the exposed surface of the transparent polymeric spacing layer. Typically, the reflective layer consists of a reflective material such as silver or aluminum. The metal is applied by vapor deposition over the second surface of the space coat. The thickness of the reflective layer depends on the particular metal used and is generally between about 500 and 1000 nanometers.

In one embodiment, one or more protective layers may be applied to the top surface of the microsphere lenses. The protective layer may be a topcoat and/or a cover sheet. The topcoat and/or cover sheet of the retroreflective sheet overlies and conforms to the top surface of the microsphere lenses.

The coating weight of the topcoat may range from about 25 to 175 gms/m$^2$. Preferably the coating weight is about 50 to 150 gms/m$^2$ and more preferably is from about 60 to 120 gms/m$^2$. The topcoat thickness may range from 25 to about 125 microns and more often is from about 50-100 microns. Specifically, the embedded microspheres may be coated with a transparently colored topcoat. In one embodiment, portions of the microsphere surface can be lower than, higher than, or both lower and higher than the surrounding areas of the microsphere surface. As such, the portions of the microsphere surface lower than the surrounding areas would appear to have a slightly darker color, the portions of the microsphere surface higher than the surrounding microsphere surface would appear to have a slightly lighter color as well as having varying reflective attributes. The embedded microspheres may also be coated with a clear topcoat or adhesive. As such, the portions of the microsphere surface lower than the surrounding areas would appear to have only the varying reflective attributes.

The topcoat and/or cover sheet may comprise various thermoplastic polymers including acrylic polymers such as polymethylmethacrylate, vinyl polymers such as PVC and vinyl acrylic copolymers, or polyurethanes such as aliphatic polyether urethanes. Cover sheets include an impact modified polymethylmethacrylate (PMMA) (e.g., Plexiglas™ acrylic DR, MI-7 (Rohm & Haas), Perspex™ acrylic HI-7 (ICI), or blends thereof), a vinyl acrylic formulation (methyl methacrylate/butyl methacrylate) copolymer and a PVC homopolymer) or a polyurethane. The aliphatic polyurethane cover sheet is produce by casting the urethane onto a polymer coated paper casting sheet or onto a polymer casting sheet. Casting sheet products are well known to the industry and supplied by companies such as Felix Schoeller Technical Papers, Pulaski, N.Y., S.D. Warren of Newton Center, Mass. and Ivex Corporation of Troy, Ohio. The urethane coating is coated onto the casting sheet by standard coating methods such as curtain coating, slot die coating, reverse roll coating, knife over roll coating, air knife coating, gravure coating, reverse gravure coating, offset gravure coating, Meyer rod coating, etc. To achieve proper performance and coat weight thickness in each of the coating operations, technical expertise is applied to determine the optimal urethane solution viscosity. The application of these coating techniques is well known in the industry and can effectively be implemented by one skilled in the art. The knowledge and expertise of the manufacturing facility applying the coating determine the preferred method. Further information on coating methods can be found in "Modern Coating and Drying Technology", by Edward Cohen and Edgar Gutoff, VCH Publishers, Inc., 1992. Extrusion or extrusion coating are alternate methods of forming a urethane film.

In another embodiment it is desirable to use two or more layers to form a topcoat/cover sheet layer. These may consist of any of the aforementioned materials in combination with a transparent pressure sensitive adhesive (such as AS352RX acrylic adhesive from Avery Chemical in Mill Hall Pa.) underlying the cover sheet and in intimate contact and conforming to the microspheres. The cover sheet or pressure sensitive adhesive can be colored with a transparent pigment or dye or even be printed with a graphic which can be located on the interior or the exterior of the cover sheet. In yet another embodiment the pressure sensitive adhesive can be replaced by a thermal bonding layer, a heat activated adhesive, or a material which forms chemical bonds to the cover sheet.

In one embodiment, the retroreflective sheeting of the present invention may also include a pressure sensitive adhesive and optionally a release liner. An adhesive layer may be applied over the reflective layer to protect the reflective layer and to serve a functional purpose such as adhering the sheeting to a substrate. Conventional pressure-sensitive adhesives such as acrylic-based adhesives, or heat- or solvent-activated adhesives are typically used and may be applied by conventional procedures. For example, a preformed layer of adhesive on a carrier web or release liner may be laminated to the reflective layer. Conventional release liners may be utilized in the formation of the retroreflective sheeting of the present invention.

The retroreflective sheeting is further illustrated in reference to the drawings. In FIG. 1, retroreflective sheeting 100 has a spacing layer 106 in which are embedded a monolayer of microsphere lenses 104 at varying depths to form an image. A protective layer 102 covers the exposed surfaces of the monolayer of microspheres 104. A reflective layer 108 is adhered to spacing layer 106. Further, an adhesive layer 110 is adhered to reflective layer 108, and a release liner 112 is adhered to adhesive layer 110.

Figure 2A:
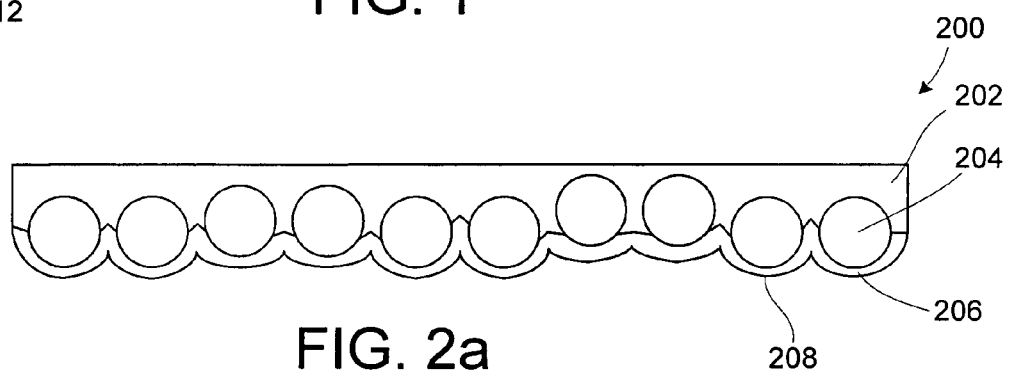
FIG. 2a is a cross-sectional view of another embodiment of a retroreflective sheeting according to the present invention.
Figure 2B:
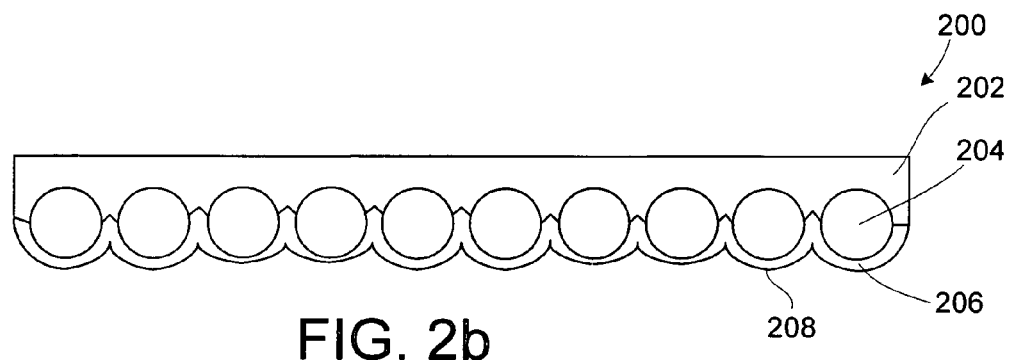
FIG. 2b is a cross-sectional view of another embodiment of a retroreflective sheeting according to the present invention.

FIGS. 2a and 2b illustrate a retroreflective sheeting 200 which does not have a pressure sensitive adhesive. As shown in FIG. 2a, retroreflective sheeting 200 has a spacing layer 206 in which are embedded a monolayer of microsphere lenses 204 at varying depths. In this embodiment, the upper surfaces of the microspheres are aligned at various depths corresponding to the elevated and depressed regions of the embedding roll surface. A protective layer 202 covers the exposed surfaces of the monolayer of microspheres 204. A reflective layer 208 is adhered to spacing layer 206.

As shown in FIG. 2b, retroreflective sheeting 200 has a spacing layer 206 in which are embedded a monolayer of microsphere lenses 204 at varying depths. In this embodiment, the upper surfaces of the microspheres are substantially aligned corresponding to the flat surface of the embedding roll. A protective layer 202 covers the exposed surfaces of the monolayer of microspheres 204. A reflective layer 208 is adhered to spacing layer 206.

Figure 3A:
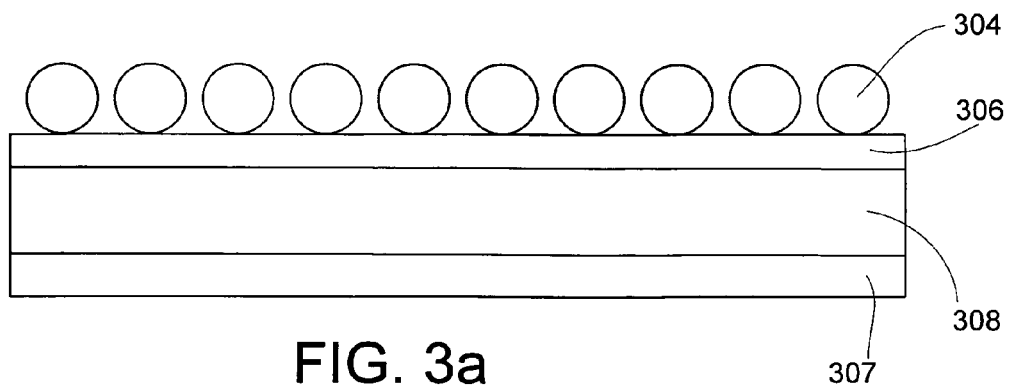
FIGS. 3a-d illustrate the process steps of the method of imparting the image on the retroreflective sheeting according to the present invention.
Figure 3B:
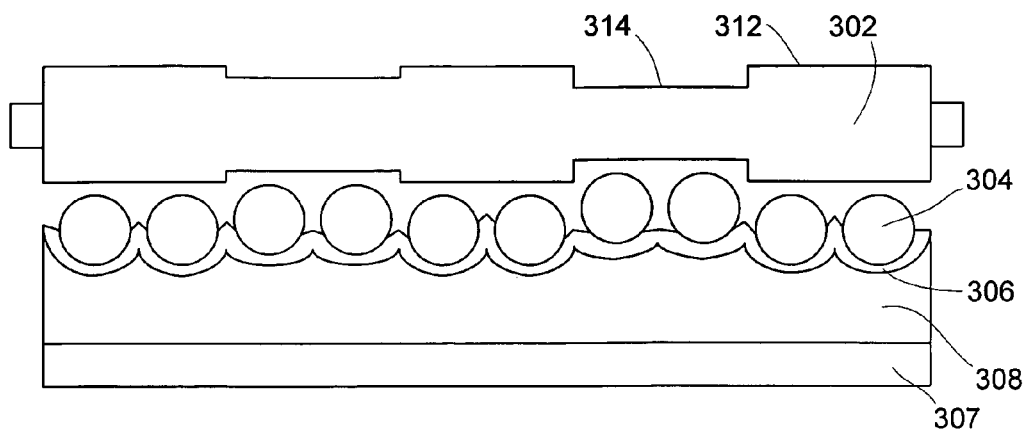

FIGS. 3a-d illustrate one embodiment of the process for making the retroreflective sheeting of the present invention. The retroreflective sheet 300 described above, can be made by procedures normally used in the industry. In FIG. 3a, a casting construction comprising a molding layer 308 having a first and second surface, and a support layer 307 in contact with the second surface of the molding layer 308 is provided. As shown in FIG. 3a, a spacing layer 306 of a desired thickness is first extruded or cast on a polymer molding layer 308 and dried if necessary. The molding layer 308 is typically made of LDPE, but can also be made of any other suitable material known in the art. The spacing layer 306 is reheated to provide a tacky surface upon which microspheres 304 are cascade-coated to form a monolayer of the microspheres.

The microspheres are embedded into the spacing layer by the application of heat and/or pressure. In one embodiment, shown in FIG. 3b, the monolayer of microspheres 304 are embedded into the spacing layer 306 at different depths, via an embedding roll 302. Heat and/or pressure is typically applied at this stage to facilitate microsphere embedding. The embedding roll 302 includes one or more elevated regions 312 or one or more depressed regions 314 or an array of elevated and depressed regions on its surface. The microspheres 304 are embedded into the spacing layer 306 at varying depths depending on the elevated and/or depressed regions of the embedding roll 302. Specifically, the elevated regions of the embedding tool 312 embed the microspheres at a greater depth into the spacing layer, as opposed to the depressed regions 314 which embed the microspheres at a lesser depth into the spacing layer. The microspheres embedded at a greater depth into the spacing layer, miss-spacing the layer to a lower than normal level, lower the reflectivity of light head on and give the reflection a slightly blue character. At angles, the reflective character also varies giving the article a directional quality. The microspheres embedded at a lesser depth into the spacing layer, miss-spacing the layer to a thicker than normal level, lower the reflectivity of light head on and give the reflection a slightly red character. At angles, the reflective character also varies giving the article a directional quality. Once embedded, the upper surfaces of the microspheres 304 are aligned at various depths, corresponding to the elevated and depressed regions of the embedding roll surface 302. The spacing layer 306 adheres to and conforms to the bottom surface of the embedded microspheres 304.

Figure 3C:
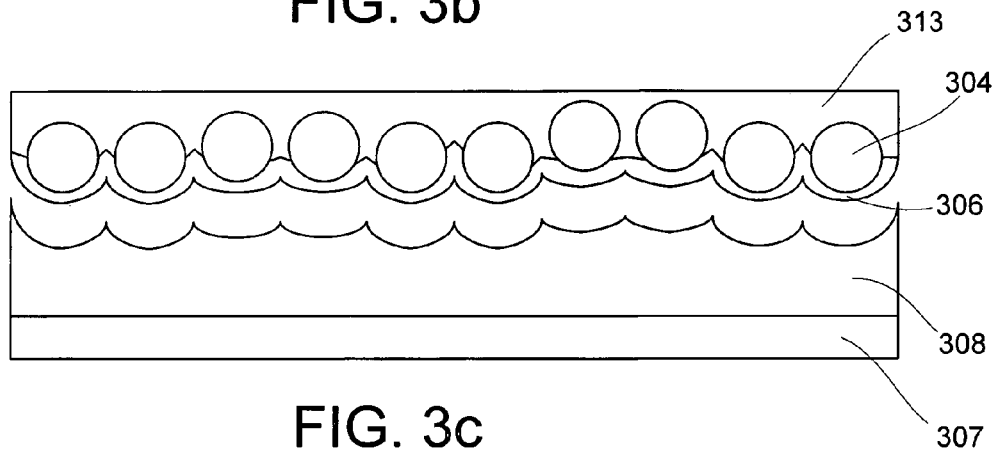

As shown in FIG. 3c, an optional protective layer 313 may be applied over the top of the exposed and partially embedded microspheres 304. If required, the protective layer 313 is then subjected to an elevated temperature to dry or cure. The casting construction comprising the molding layer 308 and support layer 307 is then stripped from the spacing layer 306.

Figure 3D:
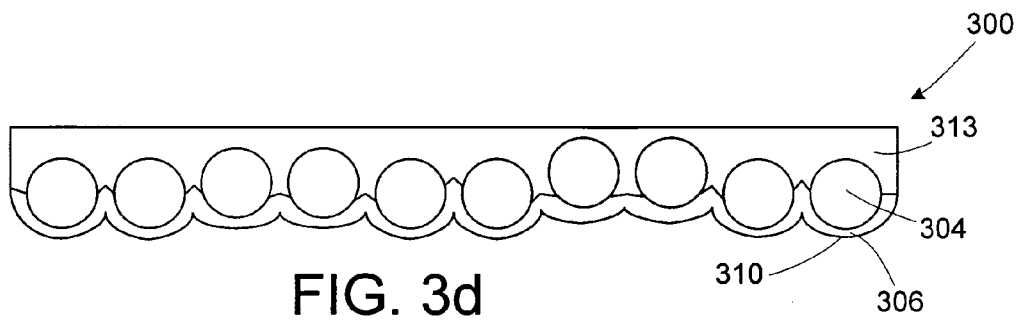

Once the casting construction is removed, a reflective layer 310 is deposited over the back surface of the spacing layer 306 to form the retroreflective sheeting 300, as shown in FIG. 3d.

Figure 4A:
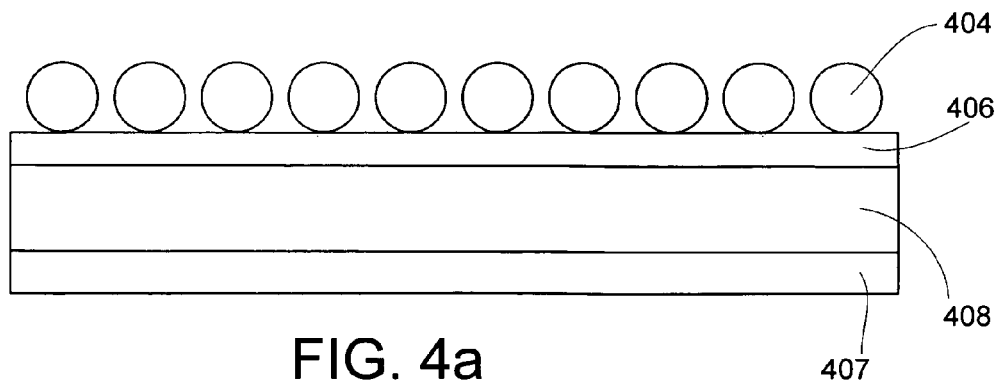
FIGS. 4a-d illustrate the process steps of an alternative method of imparting the image on the retroreflective sheeting according to the present invention.
Figure 4B:
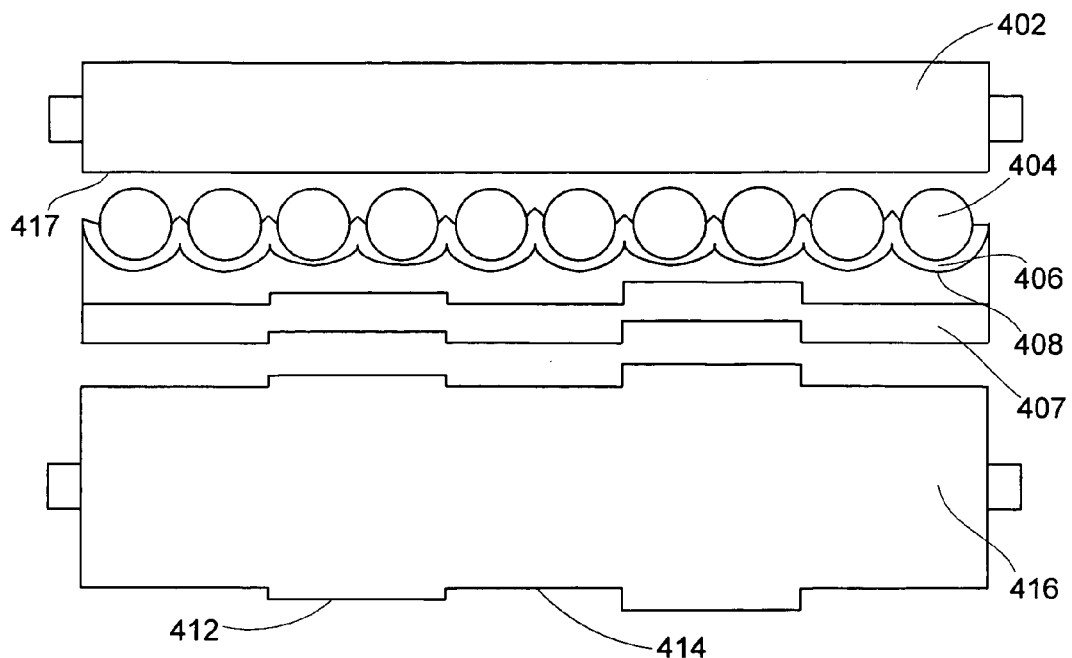

FIGS. 4a-d illustrate another embodiment of the process for making the retroreflective sheeting of the present invention. In one embodiment shown in FIG. 4a, a casting construction comprising a molding layer 408 having a first and second surface, and a support layer 407 in contact with the second surface of the molding layer 408 is provided. As shown in FIG. 4a, a spacing layer 406 of a desired thickness is first extruded or cast on a polymer molding layer 408 and dried if necessary. The molding layer 408 is typically made of LDPE, but can also be made of any other suitable material known in the art. The spacing layer 406 is reheated to provide a tacky surface upon which microspheres 404 are cascade-coated to form a monolayer of the microspheres.

The microspheres are embedded into the spacing layer by the application of heat and/or pressure. In one embodiment, shown in FIG. 4b, the monolayer of microspheres 404 are embedded into the spacing layer 406 at different depths, via an embedding roll 402 and a backing roll 416. Heat and/or pressure is typically applied at this stage to facilitate microsphere embedding. The embedding roll 402 has a smooth surface 417, whereas the backing roll 416 includes one or more elevated regions 412 or one or more depressed regions 414 or an array of elevated and depressed regions on its surface. The microspheres 404 are embedded into the spacing layer 406 at varying depths depending on the elevated and/or depressed regions of the backing roll 416. Specifically, the elevated regions of the backing tool 412 embed the microspheres at a greater depth into the spacing layer, as opposed to the depressed regions 414 which embed the microspheres at a lesser depth into the spacing layer. The microspheres embedded at a greater depth into the spacing layer, miss-spacing the layer to a lower than normal level, lower the reflectivity of light head on and give the reflection a slightly blue character. At angles, the reflective character also varies giving the article a directional quality. The microspheres embedded at a lesser depth into the spacing layer, miss-spacing the layer to a thicker than normal level, lower the reflectivity of light head on and give the reflection a slightly red character. At angles, the reflective character also varies giving the article a directional quality. Once embedded, the upper surfaces of the microspheres 404 are substantially aligned corresponding to the flat surface of the embedding roll 417. The spacing layer 406 adheres to and conforms to the bottom surface of the embedded microspheres 404.

Figure 4C:
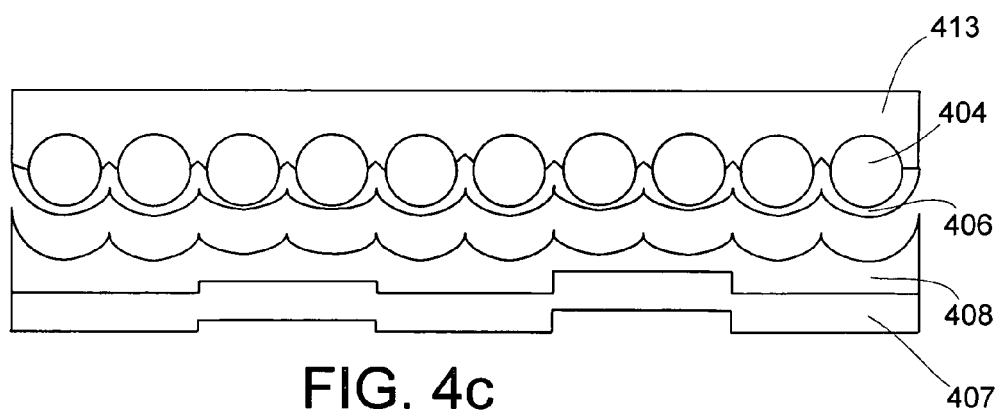

As shown in FIG. 4c, an optional protective layer 413 may be applied over the top of the exposed and partially embedded microspheres 404. If required, the protective layer 413 is then subjected to an elevated temperature to dry or cure. The casting construction comprising the molding layer 408 and support layer 407 is then stripped from the spacing layer 406.

Figure 4D:
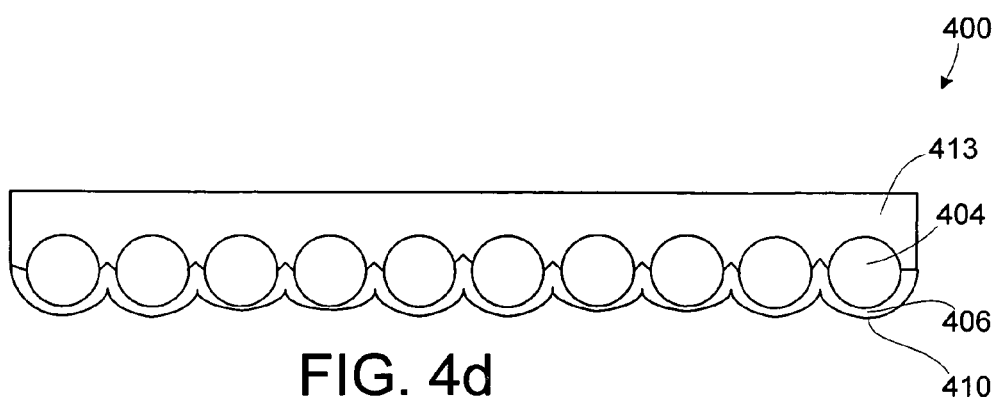

Once the casting construction is removed, a reflective layer 410 is deposited over the back surface of the spacing layer 406 to form the retroreflective sheeting 400, as shown in FIG. 4d.

The following Examples illustrate the process for preparing retroreflective sheeting with a discernable image and the retroreflective sheeting thus formed.

EXAMPLE 1

A spacing layer is coated from a solution of transparent polyvinyl butyral (PVB), such as Butvar B-90 from Solutia, with a refractive index of about 1.49 on the LDPE surface of a casting construction consisting of a LDPE molding layer on a support layer or paper (Avery 936-13) and dried to a thickness of about 33 microns. The casting construction and spacing layer are reheated to about 140 degrees centigrade to provide a tacky PVB surface upon which a monolayer of commercially available transparent 2.20 refractive index microsphere lenses about 69 microns in diameter are deposited. The heated construction is directed to a lamination station consisting of a smooth surfaced backing roll and an engraved embedding roll. The engraved embedding roll (laser engraved Viton™ surface for example) containing a combination of raised and incised patterns on the surface is used to embed the microspheres into the spacing layer by means of heat and/or pressure.

The microspheres generally are embedded into the spacing layer yielding a spacing layer thickness of about 26 microns, about 29 microns and about 32 microns corresponding to the raised, planer, and incised areas of the embedding roll. The upper surfaces of the microspheres are aligned at various depths corresponding to the raised, planer, and incised areas of the embedding roll. The excess spacing layer is partially extruded between the microspheres. When the microsphere lenses are embedded into the spacing layer, the PVB spacing layer adheres to and conforms to the bottom surface of the microsphere lenses. The embedded microsphere lenses are coated with a transparently colored, two-component urethane protective layer with a refractive index of about 1.55 and cured. The portions of the microsphere surfaces lower than the surrounding plane have a slightly darker color, the portions of the microsphere surfaces higher than the surrounding plane have a slightly lighter color. The molding layer and support paper are then stripped from the spacing layer, and a reflective layer of aluminum is deposited over the exposed surface of the transparent polymeric spacing layer.

A transfer adhesive consisting of an acrylic adhesive on a paper release liner is adhered to the vapor deposited aluminum.

EXAMPLE 2

A spacing layer is coated from a solution of transparent PVB, such as Butvar B-90 from Solutia, with a refractive index of about 1.49 on the LDPE surface of a casting construction consisting of a LDPE molding layer on a support layer or paper (Avery 936-13) and dried to a thickness of about 25 microns. The casting construction and spacing layer are heated to about 140 degrees centigrade to provide a tacky PVB surface upon which a monolayer of commercially available transparent 2.14 refractive index microsphere lenses with an average size of about 48 microns in diameter are deposited. The heated construction is directed to a lamination station consisting of an engraved surfaced backing roll and a smooth surfaced embedding roll. The engraved backing roll (photoetched steel roll for example) containing a combination of raised and incised patterns on the surface is used to provide a backing against which the smooth surfaced embedding roll is used to embed the microspheres into the spacing layer by means of heat and/or pressure.

The microspheres generally are embedded into the spacing layer yielding a spacing layer thickness of about 20 microns, about 22 microns and about 24 microns corresponding to the raised, planer, and incised areas of the backing roll. The upper surfaces of the microspheres are substantially aligned corresponding to the flat surface of the embedding roll. The excess spacing layer is partially extruded between the microspheres. When the microsphere lenses are embedded into the spacing layer, the PVB spacing layer adheres to and conforms to the bottom surface of the microsphere lenses. The embedded microsphere lenses are coated with a transparent acrylic adhesive with a refractive index of about 1.52, dried and adhered to a vinyl cover sheet. The molding layer and support paper are then stripped from the spacing layer, and a reflective layer of aluminum is deposited over the exposed surface of the transparent polymeric spacing layer.

A transfer adhesive consisting of an acrylic adhesive on a paper release liner is adhered to the vapor deposited aluminum.

In one example, a combination of raised and incised patterns is used in the shape of small American flags. The area of the stars and white stripes comprise the normal plane of the embedding roll. The star field is raised above the plane and the area comprising the red stripes are incised into the surface of the roll. The finished white reflective material would appear to have white stars on a blue field and white and red stripes in reflection.

While the invention has been explained in relation to its various embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A retroreflective sheet with an image comprising:
    a transparent polymeric spacing layer having a first surface and a second surface;
    a layer of transparent microsphere lenses embedded into the first surface of the spacing layer at varying depths forming an image, wherein the first surface of the spacing layer adheres to the bottom of the microspheres, the second surface of the spacing layer conforms to the bottom of the microspheres, and the spacing layer thicknesses between the bottom of different microspheres and the second surface of the spacing layer are not all the same;

a reflective layer adhered to the second surface of the spacing layer; and at least one protective layer overlying and conforming to the top surfaces of the embedded microspheres.

2. The retroreflective sheet of claim 1 wherein the protective layer comprises a topcoat.

3. The retroreflective sheet of claim 1 wherein the protective layer comprises a cover sheet.

4. The retroreflective sheet of claim 1 wherein the protective layer comprises a topcoat and a cover sheet.

5. The retroreflective sheet of claim 1 wherein the microspheres have an average refractive index in the range of about 1.8 to about 2.5.

6. The retroreflective sheet of claim 5 wherein the microspheres comprise glass microspheres having an average diameter in a range of from about 25 to about 300 microns.

7. The retroreflective sheet of claim 1 further comprising an adhesive layer underlying and in contact with the reflective layer.

8. The retroreflective sheet of claim 7 wherein the adhesive layer is a pressure sensitive adhesive.

9. The retroreflective sheet of claim 7 wherein the adhesive layer is a heat activated adhesive.

10. The retroreflective sheet of claim 1 wherein the spacing layer comprises an acrylic polymer, a polyvinyl butyral, an aliphatic polyurethane, a polyester, or mixtures thereof.

11. A retroreflective sheet with an image comprising:

a transparent polymeric spacing layer having a first surface and a second surface;

a monolayer of transparent microsphere lenses embedded into the first surface of the spacing layer at varying depths forming an image, wherein the first surface of the spacing layer adheres to the bottom of the microspheres, the second surface of the spacing layer conforms to the bottom of the microspheres, and the spacing layer thicknesses between the bottom of different microspheres and the second surface of the spacing layer are not all the same;

a reflective layer adhered to the second surface of the spacing layer; and at least one protective layer overlying and conforming to the top surface of the embedded microspheres.

12. The retroreflective sheet of claim 11 wherein the protective layer comprises a topcoat.

13. The retroreflective sheet of claim 11 wherein the protective layer comprises a cover sheet.

14. The retroreflective sheet of claim 11 wherein the protective layer comprises a topcoat and a cover sheet.

15. The retroreflective sheet of claim 11 further comprising an adhesive layer underlying and in contact with the reflective layer.

16. The retroreflective sheet of claim 15 wherein the adhesive layer is a pressure sensitive adhesive.

17. The retroreflective sheet of claim 15 wherein the adhesive layer is a heat activated adhesive.

* * * * *